United States Patent [19]

Longrod

[11] 4,376,469
[45] Mar. 15, 1983

[54] STEPPED ACOUSTIC TRANSPORT MEMBER

[75] Inventor: Scott J. Longrod, Danbury, Conn.
[73] Assignee: SCM Corporation, New York, N.Y.
[21] Appl. No.: 246,818
[22] Filed: Mar. 23, 1981
[51] Int. Cl.³ .............................................. B41J 5/08
[52] U.S. Cl. ................................ 181/142; 178/17 C; 310/334; 400/477
[58] Field of Search ...................... 340/365 R, 365 S; 84/1.1, 438, 404; 178/17 C, 30; 367/191; 310/328, 334; 116/169; 181/142

[56] References Cited

U.S. PATENT DOCUMENTS 3,229,021  1/1966  Baschet .............................. 84/404 X Primary Examiner—Maynard R. Wilbur
Assistant Examiner—K. R. Kaiser
Attorney, Agent, or Firm—William E. Mear, III; Ernest F. Weinberger

[57] ABSTRACT

An acoustic transport member for use in a keyboard having key operated strikers individually actuatable for inducing acoustic energy in the form of sound waves which propagate through the member from selected inducing positions therealong. A first portion of the member is fabricated to provide discrete impact positions for generating sound waves in response to impact actuation of related strikers. A second portion integrally connected with the first portion links all impact positions for receiving and transporting all sound waves generated by the first portion. A step joins the first with the second portions to allow communication of the sound waves from the first portion into the second portion yet thereafter provides unidirectional acoustic separation therebetween which effectively minimizes wave dispersion by substantially isolating the propagating sound waves in the second portion from coming into contact with successive impact positions of the first portion.

11 Claims, 8 Drawing Figures

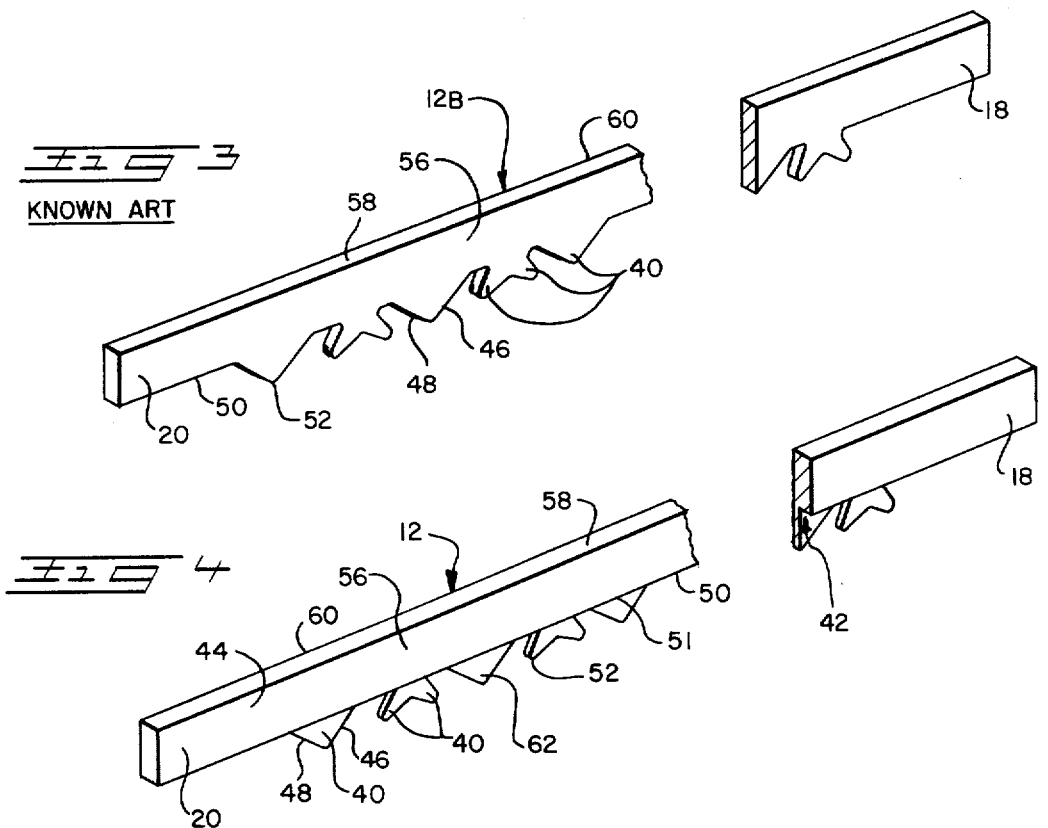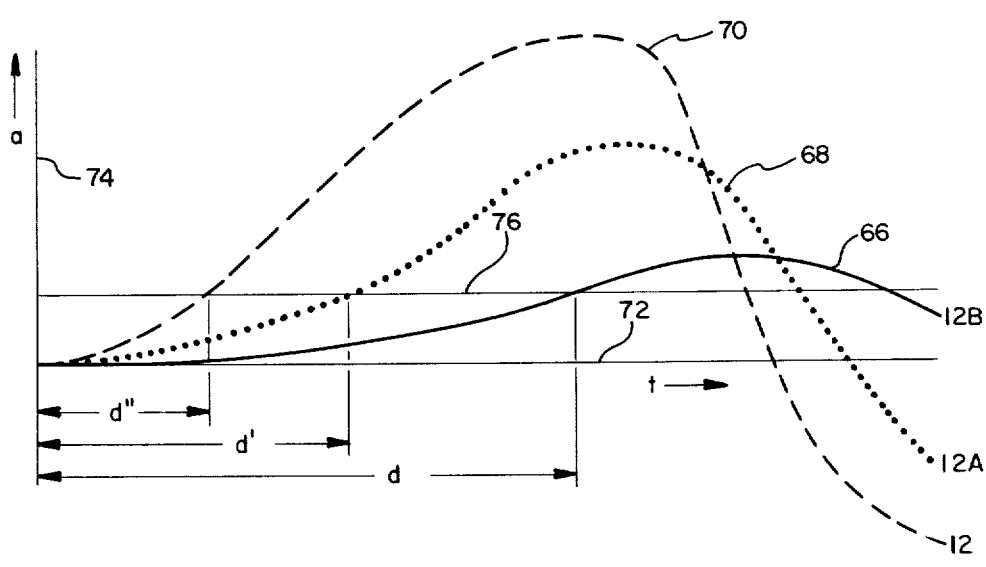

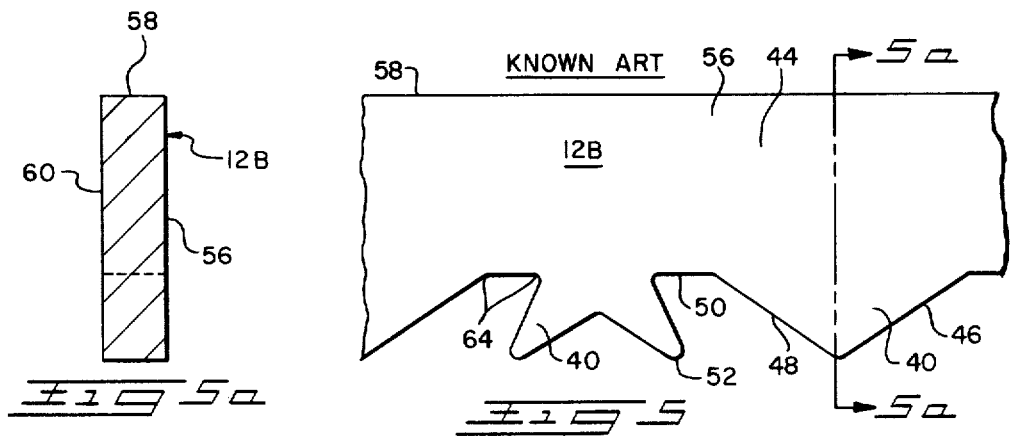
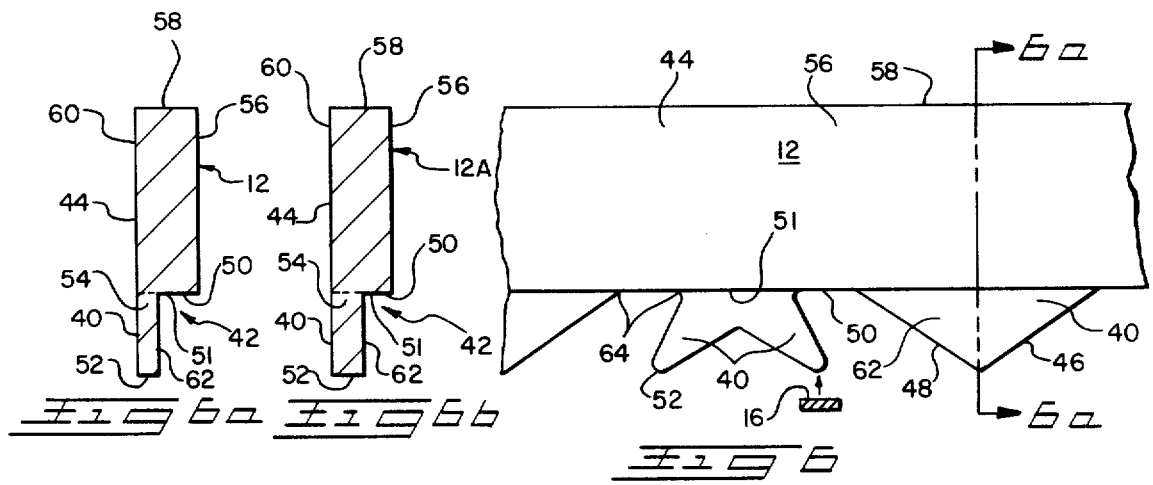
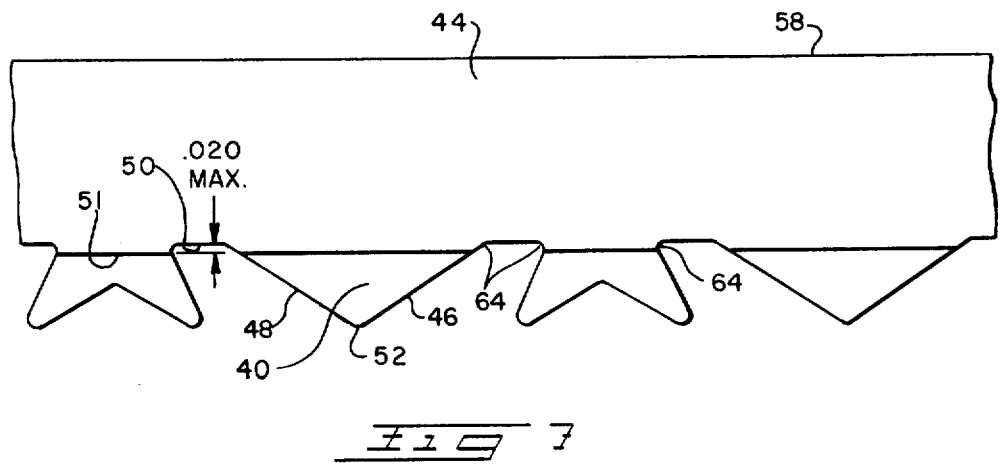

STEPPED ACOUSTIC TRANSPORT MEMBER

BACKGROUND OF THE INVENTION

1. Field of the Invention

The present invention relates to acoustic transport members used for transmitting sound waves utilized in an acoustic keyboard system to provide information representative of a key selected. More particularly, this invention relates to improvements in the acoustic transport member over the construction disclosed in U.S. applications identified by: Ser. No. 087,854 entitled "Acoustic Encoding Apparatus", filed Oct. 24, 1979 which is a continuation of application Ser. No. 853,778 filed Nov. 21, 1977 now abandoned; Ser. No. 892,814 entitled "Multi-Bar Encoding Apparatus Utilizing Acoustic Energy", filed Apr. 3, 1978 now U.S. Pat. No. 4,258,356, both invented by Vincent P. Jalbert, and particularly a copending application Ser. No. 246,820 invented by Raymond A. Pajer et al entitled "Encoding Apparatus Utilizing Acoustic Waves of Controlled Polarity", filed on even date herewith. The three above-mentioned applications have the same assignee as the present application. To the extent appropriate to the present invention, the disclosures of the above-identified U.S. applications are incorporated herein by reference.

2. Description of the Prior Art

Keyboards of the acoustic type have been demonstrated to be a successful advancement in the art, especially those keyboards used in conjunction with an encoding apparatus. Generally, acoustic keyboards employ sound inducing key means that operate to launch sound waves within an acoustic transport member assembled in the acoustic keyboard. These sound waves provide information e.g., elapsed time measured by circuitry and used to produce a discrete coded representation of the selected key. Examples of acoustic systems having keyboard input are fully outlined in the above-mentioned applications U.S. Pat. No. 4,258,356, and simultaneously filed copending application of Raymond A. Pajer et al, (hereinafter referred to as prior applications I, II and III, respectively). Another example of an acoustic system using a member for transporting sound waves is disclosed in United Kingdom Pat. No. 1,386,070, granted to Roger Bennison, published Mar. 5, 1975 and entitled "Pressure Actuated Signalling Means". These acoustic systems all employ a form of an acoustic member capable of transporting sound waves. Yet, in the art there is a continued search to improve the reliability of these acoustic systems, particularly in the development of an acoustic member fabricated to sustain the intensity of the sound wave signal over the distance they travel within the acoustic member as pointed out below.

In prior copending application I and the British Patent of Roger Bennison, the acoustic transport member disclosed is an elongated continuous cylindrical rod. The disclosed straight rod successfully transports sound waves, however lacks structure defining discrete impact points from which sound waves are emitted in response to key actuation. A well-defined impact point is necessary for ensuing encoding circuitry to accurately determine the key position selected along the rod. Accordingly, these two acoustic systems are sensitive to the lateral positioning of the sound inducing keys along the member. It has been found that sideways displacement of the sound inducing device with respect to the rod changes the intended impact location along the member and thereby introduces an acoustical variable in the system.

In prior application II, there is disclosed a different acoustic system based on sensing sound waves transmitted through a plurality of acoustic transport members. The acoustic principle disclosed in this system improves on the accuracy and reliability of known acoustic systems, however it is more complex and costly to implement. The acoustic members in prior application II are structured to include distinct impact points in the form of tabs pre-positioned along the member. Each acoustic member is generally a bar supporting the tabs in a longitudinal relationship according to the spacing of the sound-inducing strikers. These tabs provide the necessary structure on the member to afford lateral stability with respect to the strikers contacting the bar at precisely the same location along the bar with each actuation.

While the acoustic member with tabs (prior application II) is a considerable improvement over the previously straight rod members, in terms of laterally fixing the impact points in relationship with one another along the member, the multiple tabbed bars have been found to produce sound wave signals lacking in intensity compared to those generated within the straight rod over the same distance.

Copending application III discloses an acoustic transport member fabricated with specially-shaped teeth or dissimilar tabs that generate sound waves having a particular polarity combination different among adjacent impact points (tabs). As a result, this acoustic system produces a set of signals within a single acoustic member that are readily and accurately distinguishable for proper functioning by encoding devices even in the presence of acoustic variables effecting the intensity of the sound waves when received by sound wave sensing and converting transducers coupled on the member.

In using the toothed member of copending application III, it was discovered that sound waves originating from near one end of the member produced a set of sound waves that when received by their respective transducer were significantly different in intensity levels based on the distance each is required to travel. In other words, the wave traveling the shorter distance is much higher in intensity than the wave forced to travel to the far end of the member. The reason for dissimilar intensity levels is attributed to dispersion or a scattering of the wave form in passage (lengthwise) through the member. Dispersion is believed to be primarily caused by the propagating waves entering enlarged areas represented by the tabs and being reflected off discontinuously orientated surfaces presented by the tab ends with respect to the intended direction of wave movement towards the transducers. Though the acoustic system repeatedly functioned properly with dissimilar wave intensities when tested in a laboratory environment, it is felt that this condition could cause marginal operation of the encoding device over a period of time and in consideration of high volume production. Accordingly, there is a need for improving the toothed acoustic transport member in an effort to equalize sound wave intensity sensed at each end of the member for safety sake.

SUMMARY OF THE INVENTION

The present invention substantially overcomes the above-mentioned dissimilar intensity problem by providing a keyboard having an acoustic transport member fabricated in a manner whereby dispersion of propagating sound waves is minimized. To attain this, a first portion on the member comprises a plurality of tabs for generating sound waves within the member. A second portion of the member is integrally formed with the first portion and functions as a sound corridor for transporting sound waves through the member. A step is formed along the member and connects the first and second portions. As a result of the step configuration, a narrow solid junction is formed where the two portions are joined together. Once sound waves enter into the corridor they are exposed to a continuous base surface along the second portion located adjacent the row of tabs. The base functions to reflect a major portion of the propagating sound waves traveling through the corridor thereby substantially isolating them from coming into contact with the first portion. By isolating the sound waves in this manner wave dispersion along the acoustic member is minimized.

In the acoustic keyboard, a series of strikers are individually actuatable by related selectable key means. Each striker is located opposite a related tab and when actuated, the selected striker impacts the tab giving rise to sound waves within the member. The induced sound waves emanate from the tip of the tab, through the junction entering the sound corridor. Once inside the sound corridor, the sound waves propagate in diverging directions toward opposite ends of the member.

Surfaces of the member act as sound wave reflecting boundaries that confine the waves within the member. The surfaces of the second or corridor portion are continuously straight extending horizontally along the member. Surfaces of the tabs are discontinuously orientated with respect to the continuous corridor surfaces. The continuous base surface formed by the step operates to reflect sound waves propagating through the corridor and to substantially prevent the moving waves from coming into contact with tab surfaces they are passing. As a result of substantially isolating the waves from contact with discontinuous surfaces, dispersion of the waves is minimized.

The propagating sound waves transported through the stepped acoustic transport member come in contact with a minimum number of surfaces that reflect the sound waves and thus suffer the least amount of distortion. Accordingly, the amplitude of the sound waves traveling through the corridor remains at a substantially constant and predicatable level that diminishes at only a slight rate primarily determined by the distance traveled.

Successful operation of acoustic keyboard systems, such as those described in aforementioned prior copending applications are vitally dependent upon receipt of well-defined quality sound waves. The present stepped acoustic transport member, in minimizing wave dispersion, repeatably and consistently present sound waves of high amplitude.

Generally stated, it is an object of the present invention to provide an improved member for transport of sound waves in an acoustic system.

Another object of the present invention is to increase the operable reliability of the acoustic transport member used in acoustic keyboards, such as disclosed in prior U.S. applications I, II and III.

More specifically, it is an object of the present invention to provide an acoustic transport member that enables the transport of sound waves through the member with minimal wave dispersion.

Other objects and many of the attendant advantages of this invention will be readily appreciated as the same becomes better understood by reference to the following detailed description when considered in connection with the accompanying drawing.

DESCRIPTION OF THE DRAWING

FIG. 3 is a perspective view of a known acoustic transport member according to copending application III.

FIG. 4 is a perspective view of the present acoustic transport member removed from the keyboard.

FIG. 5 is a plan view of a portion of the known member in FIG. 3.

FIG. 5a is a cross-section elevational view of the known member of FIG. 5 along 5a—5a.

FIG. 6 is a plan view of a portion of the present acoustic transport member in FIG. 4.

FIG. 6a is a cross-section elevational view taken along line 6a—6a of FIG. 6 showing a preferred embodiment of an acoustic transport member.

FIG. 6b is a view similar to FIG. 6a showing another embodiment of the acoustic transport member.

FIG. 7 is a plan view of a portion of the present acoustic transport member showing a maximum tolerance mismatch permissable between a bottom and a base of the present acoustic transport member.

FIG. 8 is a graph showing amplitude as a function of time for comparing a wave form produced by the known acoustic transport member according to FIG. 5a and the two embodiments of the present acoustic transport member according to FIGS. 6a and 6b.

DESCRIPTION OF THE PREFERRED EMBODIMENT

Figure 1:
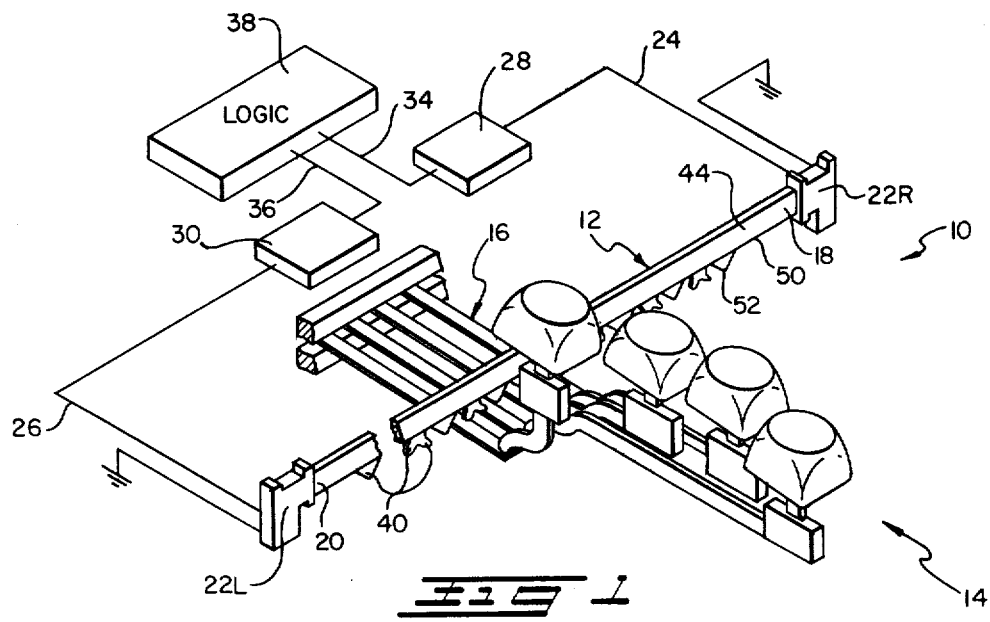
FIG. 1 is a perspective view showing an acoustic transport member fabricated according to the invention assembled in an acoustic keyboard of the type disclosed in prior copending application I.

In the illustration of FIG. 1 there is shown the basic operating components contained in a keyboard 10 of the acoustic type. An acoustic transport member 12 fabricated according to a preferred embodiment of the invention is fixedly mounted by structure not shown to span keyboard 10. A brief description regarding the general operation and techniques used in acoustic keyboards, such as keyboard 10, is given below for a better understanding of the development of the present acoustic transport member 12. A more complete description concerning acoustic keyboard systems is found in the aforementioned prior applications I and II and copending application III.

Acoustic keyboards—like other kinds of keyboards—include a plurality of depressible keys 14 for selectable actuation by the operator. A plurality of flexible strikers 16 are individually operable—in a flicking motion—by a related one of the keys 14 for delivering an impact blow to the member 12. The blow is sufficient for inducing sound waves sent forth from selected impact positions located along the member 12.

In the acoustic keyboard 10, the member 12 is used to transport the sound waves in diverging directions from their point of impact towards opposite ends 18 and 20. Identical transducers 22R and 22L (R and L denotes right and left) are operatively attached on ends 18 and 20 of member 12 respectively, for sensing and converting sound waves into corresponding electrical signals sent along lines 24 and 26.

Figure 2:
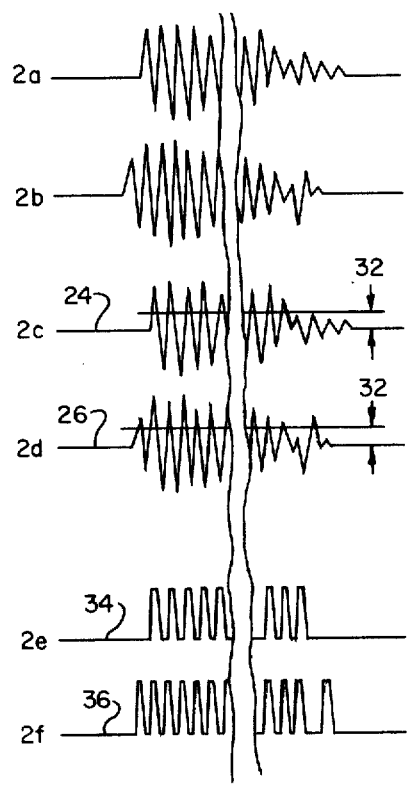
FIGS. 2a-2f present individual illustrations of various signals generated by the components of FIG. 1.

FIGS. 2a and 2b generally illustrate the characteristic nature of each diverging sound wave as they propagate through the member 12. Each sound wave 2a and 2b, when viewed over its duration, is generally by nature a complex composite of multiple cycles whose intensity will taper off as energy is dissipated within member 12. The wave illustrated in FIGS. 2c and 2d shows wave characteristics of voltage signals emitted by transducers 22R and 22L in response to receiving sound signals 2a, 2b. Voltage signals 2c and 2d are then sent along connected output lines 24 and 26 (FIG. 1), respectively. If the sound waves 2a and 2b are compared to the corresponding voltage signals 2c and 2d, similarities will be noted with respect to frequency and amplitude of the compared signals. Thus, the intensity of the received sound wave signals 2a and 2b is substantially equal to the voltage output signals 2c, 2d.

In FIG. 1, first and second signal conditioning circuitry, illustrated by boxes 28, 30 are connected to receive the voltage signals 2c and 2d appearing on lines 24, 26. In general, the conditioning circuitry boxes 28 and 30 include a comparator (not shown) provided with a reference voltage and an RC type circuit input used to establish a predeterminable electronic sensing threshold level 32 in FIGS. 2c, 2d as will be seen. The primary purpose of the signal conditioning circuitry boxes 28 and 30 is to modify the incoming signals 2c, 2d into a series of constant amplitude logic pulses appearing on connected output lines 34, 36. FIGS. 2e and 2f illustrate the form of the modified signals on lines 34, 36 which are now compatible for use to operate ensuing logic circuitry contained within a logic block 38. Another purpose of the conditioning circuitry devices 28, 30 is to set the electronic sensing threshold 32, shown in FIGS. 2c and 2d. This constant level peak cut off pre-establishes a minimum acceptable voltage amplitude and thereby filters out weak voltage excursions. Signals received on lines 24 and 26 below the sensing threshold 32 are thus eliminated as shown by the subsequent absence of an output pulse (FIGS. 2e, 2f) on lines 34 and 36. The connected logic block 38 comprises a network of inter-connected electrical components including a time-measuring counter (not shown) for measuring elapsed time between the arrival of the initial pulse of signals 2e, 2f. Logic block 38 begins operation upon receipt of the first arriving signal along either of lines 34, 36 and stops with the arrival of the other or following signal. The start-stop measurement represents the time interval utilized in logic block 38 to establish a code representative of the selected striker 16 which, in turn, is used to control machine functioning, accordingly. A suitable operative logic block 38, as well as aforementioned conditioning circuitry 28 and 30, are fully described in prior copending applications I and III.

The above description refers in general to known acoustic systems employing the acoustic keyboard 10 and used preferably in connection with controlling the multiple functions of a typewriter. Specifics of the present invention will now be described and its advantages can be fully appreciated in view of the overall techniques disclosed in connection with acoustic keyboard 10.

In using the acoustic type keyboard 10, equipped with a known acoustic transport member (i.e., those disclosed in prior U.S. applications I and II and hereinafter referred as "conventional" acoustic members) and the toothed member 12B disclosed in copending application III, shown in FIGS. 3, 5 and 5a, the acoustic system is found to be sensitive to factors which will vary the accuracy of the encoding process, particularly variations effecting the propagation velocity and amplitude of the acoustic waves as they travel within the conventional members and member 12B. Variations in acoustic systems are a result of change in temperature, material property, acoustic dispersion (i.e., changes in transducer signal rise time with distance from the strike point), electronic threshold 32 drift, reference frequency drift, shifting impact point, wear at the impact point and timer resolution. A successful development in reducing the effects of many of these variations in the system is the toothed configuration of member 12B (FIGS. 3, 5) disclosed in copending application III. Acoustic member 12B is fabricated with teeth or tabs 40 shaped in three different triangular configurations to generate dissimilar wave meansings (different polarity combinations) among adjacent impact positions. As a result a wider time measuring tolerance or band (compared to conventional acoustic members) is provided in logic 38 for more readily distinguishing elapsed time among sound waves generated from adjacent strike points and thus enabling the acoustic system to perform acceptably even in the presence of wave propagating variations.

Though a significant improvement over the prior art is provided by uniformly thick acoustic member 12B, one area found in need of further improvement is in reducing the effects known as wave dispersion known to occur within the toothed member 12B. Wave dispersion accelerates the energy dissipating process which weakens the intensity of the waves. Dispersion is attributed to sound waves contacting and reflecting off peripheral boundary surfaces of member 12B. Though the acoustic system employing toothed member 12B is operable, discontinuous surfaces 46, 48 formed by the tabs 40 have enhanced dispersion over conventional straight members. Accordingly, the present stepped acoustic member 12, in FIG. 4, is constructed to minimize the amount of wave dispersion by being structured to substantially isolate the wave from contact with discontinuous surfaces 46, 48 while retaining the advantages accomplished by the acoustic member 12B described in copending application III.

According to the present invention, the acoustic transport member 12 (FIG. 4) is in the form of an elongated bar fabricated to provide two inter-connected portions each structured for transporting sound waves in an intended manner. A step 42, is provided along member 12 to define dissimilar cross-sectional thicknesses of member 12. A first portion of member 12 comprises tabs 40, which are now thinner in cross-section when compared to a second portion that functions as a sound corridor 44 for transporting sound waves towards ends 18 and 20. Preferably, acoustic transport member 12 is fabricated from a metal material having the capability of propagating sound waves at a predeterminable, substantially constant velocity within itself upon impact, e.g., by striker 16. The tabs 40 are illustrated as a group of three dissimilar triangles arranged in a repeated pattern for generating diverging sound waves with a particular set of polarity meanings when sensed by the transducers 22R, 22L for more readily assuring uniqueness of the codes generated according to the acoustic system disclosed in copending application III. For purposes of the present invention, other shapes including member 12 having all tabs 40 identically constructed would be equally satisfactory. Discontinuous surfaces 46 and 48 of tabs 40 extend angularly from a bottom 50 of corridor 44 along the member 12 in a converging fashion to form an impact tip 52 (strike point) proximate a related striker 16 as is shown in FIG. 6. The tips 52 of tabs 40 are spaced along the bottom 50 according to the horizontal spacing of the strikers 16 with at least one tip 52 provided for each one of the strikers 16.

As best illustrated in cross-sectional FIGS. 6a and 6b, corridor 44 is integrally joined with tabs 40 at junction 54. The corridor 44 is substantially rectangular in cross-section defined by peripheral smooth surfaces including the bottom 50, a front 56, a top 58 and a rear 60 side of the member 12. These surfaces 50, 56, 58, 60 extend along member 12 and are continuous with respect to discontinuous angular surfaces 46 and 48.

Step 42 is formed by a base 51 horizontally extending across tabs 40 along the bottom 50. A face surface 62 is indented from front surface 56 of each tab 40. Tabs 40 preferably share common rear side 60 of corridor 44 thereby placing tabs 40 towards the rear of keyboard 10 when member 12 is assembled into that keyboard. Alternatively, tabs 40 could be disposed along common front side 56, forward on the assembled member 12, or intermediate surfaces 56 and 60 along bottom 50 and thus form a pair of steps 42.

The ends 18 and 20 operatively supporting transducers 22R and 22L are horizontal extensions of corridor 44. In this manner, corridor 44 spans all of the tabs 40 enabling the transducers 22R and 22L to receive sound waves induced by actuation of any striker 16.

In operation, striking the tip 52 of a selected tab 40 induces sound waves that undulate from the tip 52 through the narrow tab 40 towards junction 54. The sound waves are then communicated through junction 54 entering corridor 44 of the acoustic transport member 12. Once inside the corridor 44, the sound waves propagate in diverging directions toward the transducers 22R and 22L. In transit through the corridor 44, the propagating sound waves contact and reflect off continuous boundary surfaces 50, 51, 56, 58, 60 of member 12.

Sound waves, illustrated in FIGS. 2a and 2b, are continually being reflected off boundary surfaces 50, 51, 56, 58, 60, yet always moving in the general horizontal plane towards ends 18 and 20. With each reflection of the wave, its amplitude is slightly diminished or weakened due in part to dispersion or scattering of the wave from its natural form. The degree or amount of dispersion depends primarily upon the angle of reflection presented by boundary surfaces 50, 51, 56, 58, 60 relative to the horizontal direction of the corridor 44 transporting the propagating sound waves. For example, in using known member 12B wave excursions are allowed to enter enlarged (compared to member 12) areas of tabs 40 wherein they contact and bounce off angular surfaces 46 and 48, which are discontinuously orientated with respect to the horizontal plane of corridor 44. This serves to aggravate dispersion of the traveling wave. Of course, some degree of dispersion occurs in member 12 as a result of reflection off continuous surfaces 50, 51, 56, 58, 60 of corridor 44, but to a significantly lesser extent, as will be discussed.

The significance of the effects caused by wave dispersion in e.g., acoustic transport member 12B is realized in the kind of corresponding voltage signal emitted from transducers 22R and 22L onto lines 24 and 26, respectively. Transducers 22R and 22L are only capable of sending forth voltage excursions comparable in form to those of sound waves received. Accordingly, a weak acoustic signal input produces a correspondingly weak voltage signal output. As previously stated, the voltage signal conditioning boxes 30 and 32 operate to eliminate voltage inputs received below the setting of the sensing threshold level 32. Under conditions wherein wave dispersion remains unchecked, weak sound signals received by transducers 22R and 22L in the acoustic system often produce voltage signals below the sensing threshold level 32.

An important concept concerning the present invention resides in the presence of step 42 and particularly base surface 51 establishing dissimilar thicknesses between tabs 40 and corridor 44. Sound waves as they travel in the vicinity of tabs 40 thus substantially prevent or isolate the waves from coming into contact with the thinned discontinuous surfaces 46, 48. This is because during the downward motion of each wave excursion, a major portion of the wave contacts and bounces off base 51 and bottom 50. Obviously, some portion of the propagating sound waves will enter the thinned area of the tabs 40 through junction 54. This "reverse communication" is expected to occur, yet unexpectedly has been found to have little effect on the over-all improvement provided by step 42 in sustaining the amplitude of the waves, as discussed below.

Referring to FIGS. 6 and 7, base 51 of step 40 is preferably positioned along bottom 50 extending horizontally tangent to all tooth fillets 64 connecting tabs 40 with the corridor 44. In so positioning base 51, wave contact with discontinuous surfaces 46 and 48 is substantially blocked. Precise placement of base 51 tangent to the tooth fillet 64 is readily accomplishable in model shop fabrication of a few hand-tailored samples such as those made for experimental and testing purposes. However, on a mass-production basis using known economical manufacturing techniques and high volume production equipment, a misalignment tolerance is demanded in fabricating base 51 relative to the tooth fillets 64 and bottom 50. As shown in FIG. 7, a tolerance of 0.020 maximum permits a slight manufacturing misalignment in locating base 51 below bottom 50. This tolerancerestriction allows high-speed, high-volume, economical mass production of the stepped member 12. Obviously, the 0.020 tolerance restriction is not as effective in reducing wave dispersion, compared to if the base 51 were precisely located common with bottom 50, as shown in FIG. 6. Wave dispersion still remains substantially controlled with the misaligned base 51 reflecting the wave in a manner sustaining its amplitude at a sufficiently high level e.g., above the sensing threshold 32. However, placing base 51 more than 0.020 below bottom 50 will further enlarge the contactable area of the discontinuous surfaces 46, 48, and as a result further intensify wave dispersion thereby reducing the amplitude of the waves towards an unacceptable low peak.

As previously mentioned, the traveling sound waves are always moving in the general horizontal direction towards ends 18, 20. With each reflection of the wave, its amplitude is somewhat diminished or weakened due to energy dissipating caused by dispersion or scattering of the waves excursions from its natural form. The degree or amount of dispersion depends upon the angle of wave reflection with respect to the general horizontal direction of wave movement. Thus, by providing horizontally extending surfaces 50, 51, 56, 58, 60, that substantially trap the waves within corridor 44, the present stepped member 12 minimizes wave dispersion.

FIG. 8 is a graphic illustration generally showing a measure of improvement in reducing dispersion of sound waves propagating through two slightly different embodiments of a stepped acoustic transport member 12 and 12A according to the present invention compared to known member 12B. In the graph, the solid line 66 depicts a wave form produced from toothed member 12B (disclosed in copending application III) having a uniform thickness (FIG. 5a). The dotted line 68 represents a wave form obtained using a modified stepped acoustic member 12A as will be explained below. The dashed line 70 is a wave formed from using a preferred configuration of the stepped acoustic transport member 12.

The configuration of the three acoustic members 12, 12A, 12B, generating wave forms 66, 68, 70 are identical except for the step 42 feature providing a different thickness for tabs 40 compared to corridor 44. Also, the impact point selected for producing the wave forms 66, 68, 70 shown and its distance to the transducers 22R and 22L is the same. Since only a comparitive examination of FIG. 8 is necessary to appreciate the improved quality of corresponding wave signals and for clarity sake, references relating to specific data values have been omitted.

The three acoustic members are all fabricated from bar stock approximately 0.062 of an inch thick. The first stepped member 12A, producing dotted line 68, has step 42 extending into the stock thickness about half-way or approximately 0.03 of an inch defining the width of base 51 in FIG. 6b. The preferred stepped member 12 (FIG. 6a), generating dashed line 70, has step 42 extending into the stock thickness about two-thirds or approximately 0.040 of an inch for the width of base 51. On the graph of FIG. 8 a horizontal axis 72 depicts time (t) and a vertical axis 74 is used to measure the height or amplitude (a) of the waves which signifies a measure of its intensity and can be expressed in terms of e.g., voltage levels appearing on lines 24, 26. Also shown on the graph is a horizontal line 76 used to represent an amplitude level corresponding to the pre-set threshold sensing level 32 in FIGS. 2c and 2d set in signal conditioning boxes 28, 30. The purpose of illustrating line 76 is to provide on the graph an indicator as a measure of improvement in rise time for a specific amplitude (gain in slope) of corresponding waves transported through the different members 12, 12A, 12B.

In FIG. 8, the solid wave line 66 of uniformly thick member 12B serves as a basis for comparing the other wave lines 68 and 70 of stepped members 12, 12A. In contrast, both wave lines 68 and 70 show superior form in terms of amplitude attained and shortness of rise time in crossing threshold line 76. The rise time or delay for each wave 66, 68, 70 is denoted by lengths d, d', d''. The significance of the delay times d, d', d'', is that they are primarily caused by wave dispersion dissipating energy within the different acoustic members 12, 12A, 12B. In other words, dispersion has a direct effect on the rise time of a particular wave. Accordingly, increases in the amount of dispersion causes increases or time delay in wave rise time which ultimately will effect the accuracy of the acoustic system. Therefore, the delay lengths d, d', d'' represent a measure of wave dispersion occurring within each of the members 12, 12A, 12B. As evidence from examination of FIG. 8, the stepped member 12A, whose step 42 is half-way into the bar thickness, produces wave 68 showing a significant improvement in reducing the delay period d' compared to length d of wave 66 produced by the uniformly thick member 12B. Also, there is an improvement in the increased amplitude attained by wave 68 over that of wave 66. The third wave 70 shows even a further improvement in both reducing delay time and maximum amplitude attained over the waves 66 and 68. Such noticeable improvements are surprising when considering other attempts to minimize wave dispersion include changing the over-all uniform thickness of member 12B produced little change in wave intensity. It was found that in making member 12B uniformly thicker (thicknesses equalling and greater than corridor 44) or thinner (uniform thicknesses matching the thin sections of tabs 40 on member 12) offered little with respect to reducing wave dispersion or increasing the intensity of the transduced wave signal.

Other attempts to reduce wave dispersion were tried, these included varying the angular degree of discontinuous surfaces 46 and 48 with respect to bottom 50 and changing the height of tabs 40 (different distances between tip 52 and bottom 50) on the acoustic member 12B. Some of these configurations worked better than others, but none produced the overwhelming improvements in wave quality as accomplished by adding the step 42 feature.

Regarding the thickness relationship between corridor 44 and tabs 40, in producing wave 68 of FIG. 8 a ratio of 2:1 in FIG. 6b is used and shown very effective in controlling wave dispersion within member 12A. Found even more effective is member 12 having a preferred ratio of 3:1 which produced wave 70. Accordingly, a ratio of at least 2:1 is desirable to provide continuous base 51 with a width capable of reflecting a substantial portion of the propagating sound waves thereby substantially reducing wave dispersion. Presumably, ratios less than 2:1 will provide some reduction of wave dispersion. Lesser ratios were not evaluated in view of the improved results obtained using ratios equal to and greater than 2:1. Further, applicant has found that the preferred ratio of approximately 3:1 provides a totally acceptably operating member 12 that has sufficiently durable thin tabs 40. Though the 3:1 ratio offers a satisfactory compromise between the working width for base 51 while affording sufficient strength for the tabs 40, it is presumably believed that ratios greater than 3:1 will work equally or provide still more of a reduction in wave dispersion. Ratios greater than 3:1 were not tried since those ratios (2:1, 3:1) evaluated proved to work acceptably well when used in the acoustic keyboard 10 environment.

While the foregoing description has disclosed employment of step 42 as successfully minimizing dispersion of sound waves traveling within a toothed acoustic transport member, it will be clear to those skilled in the art that the important aspect of applicant's disclosure resides in providing differences in profile thicknesses where the sound inducing portion is joined with the sound transporting portion of the acoustic member for the purpose of substantially isolating the propagating sound waves from coming into contact with discontinuous areas of the sound inducing portions they pass. Accordingly, other forms of rabbeting or reducing a portion of the acoustic member 12, such as providing a groove, channel or recess would be equally applicable. Other modifications of this nature will be evident to those skilled in the art and these too are intended to fall within the scope of the present concept. The presently disclosed embodiment is therefore to be considered in all respects as illustrative and not restrictive, the scope of the invention being defined by the appended claims rather than by the foregoing description, and all changes which come within the meaning and range of equivalency of the claaims are therefore intended to be embraced therein.

I claim:

1. An acoustic transport member for use in a keyboard, the member serving to transport acoustic energy in the form of propagating sound waves and the keyboard having a plurality of key means, and a plurality of key-actuated strikers, each one of the key means operable to actuate selectably a related one of the strikers, the member receiving a sound-inducing impact in response to actuation of the selected striker, and the induced sound waves which propagate through the member being subject to dispersion of the waves an amount determined by contactable surfaces of the member and their orientation relationship relative to an intended plane of movement for the propagating sound waves provided by the member, the improved acoustic transport member comprises:
   a one-piece construction member;
   a first portion of the member providing discrete non-vibrating impact positions aligned with related strikers for receipt of the sound-inducing impact; and a second portion of the member continuosly joined to each one of said impact positions for receiving sound waves from said first portion, said second portion having sound wave reflecting boundaries defining a continuous corridor for establishing an uninterrupted path of movement for the received sound waves to propagate therethrough in substantial isolation from said impact positions of said first portion other than the impact position aligned with the selected striker thereby minimizing dispersion of the propagating sound waves.

2. An acoustic transport member according to claim 1, wherein said first portion where continuously joined to said second portion is dissimilar in cross-sectional thickness for freely communicating the sound waves from said first portion to said second portion.

3. An acoustic transport member according to claim 1, wherein said member comprises at least one step where said first portion continuously joins said second portion and said one step serving to isolate the sound waves from entering impact positions other than the position impacted.

4. An acoustic transport member according to claim 3, wherein said step is formed by a base surface on said second portion and a face surface on said first portion.

5. An acoustic transport member according to claim 4, wherein said base surface of said step comprises one of said sound wave reflecting boundaries on said second portion.

6. An acoustic transport member according to claim 5, wherein said second portion is elongated and said base surface is continuously straight extending along said second portion.

7. An acoustic transport member according to claim 6, wherein said base surface of said second portion joins said face surface of said first portion to form an angle of about 90° therebetween.

8. An acoustic transport member according to claim 1 wherein said impact positions comprise a series of tabs, each one of said tabs having a terminal impact end and a sound communicating end continuously joined to said corridor to permit free passage therebetween of induced sound waves and all of said impact ends being spaced approximately equidistant from said corridor.

9. An acoustic transport member according to claim 8 wherein the width of said sound communicating end is enlarged with respect to said impact end.

10. An acoustic transport member according to claim 9, wherein the cross-sectional thickness of said corridor is greater than said sound communicating end of said tabs at a ratio therebetween of at least 2:1.

11. An acoustic transport member according to claim 10, wherein said ratio between said corridor and said sound communicating end of said tabs is in range comprising 2:1 to 3:1.

* * * * *